United States Patent
Sándor et al.

(10) Patent No.: US 7,809,551 B2
(45) Date of Patent: *Oct. 5, 2010

(54) CONCEPT MATCHING SYSTEM

(75) Inventors: Ágnes Sándor, Meylan (FR); Aaron Kaplan, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 440 days.

This patent is subject to a terminal disclaimer.

(21) Appl. No.: 11/173,680

(22) Filed: Jul. 1, 2005

(65) Prior Publication Data

US 2007/0005344 A1 Jan. 4, 2007

(51) Int. Cl.
*G06F 17/27* (2006.01)
(52) U.S. Cl. ......... 704/9; 704/7; 704/4; 707/3
(58) Field of Classification Search ......... 704/9, 704/4, 2; 707/7, 3, 5
See application file for complete search history.

(56) References Cited

U.S. PATENT DOCUMENTS

| | | | |
|---|---|---|---|
| 5,146,406 A * | 9/1992 | Jensen ............... | 704/9 |
| 5,418,717 A * | 5/1995 | Su et al. ............. | 704/9 |
| 5,748,973 A * | 5/1998 | Palmer et al. ....... | 704/9 |
| 5,841,895 A | 11/1998 | Huffman | |
| 5,878,385 A * | 3/1999 | Bralich et al. ...... | 704/9 |
| 5,933,822 A * | 8/1999 | Braden-Harder et al. | 707/5 |
| 5,963,940 A | 10/1999 | Liddy et al. | |
| 5,966,686 A * | 10/1999 | Heidorn et al. ..... | 704/9 |
| 6,006,221 A * | 12/1999 | Liddy et al. ........ | 707/5 |
| 6,038,560 A | 3/2000 | Wical | |
| 6,076,088 A * | 6/2000 | Paik et al. .......... | 707/5 |
| 6,178,396 B1 | 1/2001 | Ushioda | |
| 6,246,977 B1 | 6/2001 | Messerly et al. | |
| 6,263,335 B1 | 7/2001 | Paik et al. | |
| 6,263,355 B1 | 7/2001 | Harrell et al. | |
| 6,678,667 B1 | 1/2004 | Ammon | |
| 6,678,677 B2 | 1/2004 | Roux et al. | |
| 6,741,988 B1 * | 5/2004 | Wakefield et al. ... | 707/7 |
| 6,757,676 B1 | 6/2004 | Sugaya et al. | |

(Continued)

OTHER PUBLICATIONS

Hobbs, Jerry R., et al., "FASTUS: A Cascaded Finite-State Transducer for Extracting Information from Natural-Language Text", in Finite State Devices for Natural Language Processing, pp. 383; 406, E. Roche and Y. Schabes, Eds., MIT Press, Cambridge, Massachusetts [1997].

(Continued)

*Primary Examiner*—Richemond Dorvil
*Assistant Examiner*—Greg A Borsetti
(74) *Attorney, Agent, or Firm*—Fay Sharpe LLP (57) ABSTRACT

A system for retrieving documents related to a concept from a text corpus includes a set of stored semantic classes which are combinable to express the concept each class including a set of keywords, each set of keywords including at least one keyword. Syntactic rules are applied to identified text portions which include one or more of the keywords. A rule is satisfied when keywords from the first and second semantic classes are in any one of a plurality of syntactic relationships. A concept matching module identifies text portions within the text corpus which include one or more of the keywords, for applying the syntactic rules to the text portions, and for identifying those text portions which satisfy at least one of the rules. Documents to be retrieved may include at least one of the identified text portions.

20 Claims, 2 Drawing Sheets

U.S. PATENT DOCUMENTS

| | | | |
|---|---|---|---|
| 6,766,320 B1* | 7/2004 | Wang et al. | 707/5 |
| 6,847,966 B1* | 1/2005 | Sommer et al. | 707/5 |
| 6,901,399 B1* | 5/2005 | Corston et al. | 707/6 |
| 6,970,881 B1* | 11/2005 | Mohan et al. | 707/102 |
| 7,085,771 B2* | 8/2006 | Chung et al. | 707/102 |
| 7,117,207 B1* | 10/2006 | Kerschberg et al. | 707/5 |
| 2002/0103809 A1* | 8/2002 | Starzl et al. | 707/102 |
| 2003/0074187 A1 | 4/2003 | Mokhtar et al. | |
| 2004/0024583 A1 | 2/2004 | Freeman | |
| 2004/0059718 A1 | 3/2004 | Zhou et al. | |
| 2004/0078190 A1 | 4/2004 | Fass et al. | |
| 2004/0122656 A1* | 6/2004 | Abir | 704/4 |
| 2004/0167886 A1* | 8/2004 | Wakefield et al. | 707/3 |
| 2004/0181390 A1* | 9/2004 | Manson | 704/2 |
| 2004/0199375 A1 | 10/2004 | Ehsani et al. | |
| 2004/0220944 A1* | 11/2004 | Behrens et al. | 707/100 |
| 2006/0224566 A1* | 10/2006 | Flowers et al. | 707/3 |
| 2006/0224580 A1* | 10/2006 | Quiroga et al. | 707/5 |
| 2007/0174041 A1* | 7/2007 | Yeske | 704/3 |

OTHER PUBLICATIONS

Joyce, T, et al., "The Thesaurus Approach to Information Retrieval", American Documentation, 9:192-197 [1948].

Yangarber, Roman, "Scenario Customization for Information Extraction", Ph.D. Thesis, New York University [2000].

Harabagiu, et al., "FALCON: Boosting Knowledge for Answer Engines", The Ninth Text Retrieval Conference (TREC-9) [2000].

Jing, Y., et al., "An Association Thesaurus for Information Retrieval", Proceedings of RIAO-94, 4th International Conference "Recherche d'Information Assistée par Ordinateur", pp. 1-15 [1994].

Qui, Yonggang, et al., "Applying a Similarity Thesaurus to a Large Collection for Information Retrieval", Technical Report, Department of Computer Science, Swiss Federal Institute of Technology, pp. 1-15 [1995].

Buckley, Chris, et. al., "Automatic query expansion using SMART: TREC 3", in D. Harman, et., Proceedings of the TREC 3 Conference [1995].

Deerwester, S., et al., "Indexing by Latent Semantic Analysis", Journal of the American Society for Information Science 41, pp. 391-407 [1990].

Salton, G., et al., "Vector Space Model for Automatic Indexing", Association for Computing Machinery, Inc., pp. 273-280 [1975].

Allan, J., et al., "First Story Detection in TDT Is Hard", Conference on Information and Knowledge Management, Proceedings of the Ninth International Conference on Information and Knowledge Management, pp. 374-381 (2000).

Lisacek, F., Chichester, C., Kaplan, A., Sandor, A., "Discovering Paradigm Shift Patterns in biomedical Abstracts: Application to Neurodegenerative Diseases", Proceedings of the First International Symposium on Semantic Mining in Biomedicine (SMBM), Apr. 2005, European Bioinformatics Institute, Hinxton, UK.

Scheffer, T. and Leser, Ulf, "Data Mining and Text Mining for Bioinformatics: Proceedings of the European Workshop", Held in Conjunction with ECML/PKDD—2003 Dubrovnik, Croatia.

Teufel, Simone, "Meta-discourse markers and problem-structuring in scientific articles", in ACL Workshop on Discourse Structure and Discourse Markets, pp. 43-49 (1998).

Zhang, Y., et al., "Novelty and Redundancy Detection in Adaptive Filtering", Proc. ACM SIGIR, pp. 81-88 (2002).

U.S. Appl. No. 11/173,136, filed Jul. 1, 2005, Agnes Sandor, et al.

Yangarber, Roman, "Scenario Customization for Information Extraction", Ph.D. Thesis, New York University [2000].

* cited by examiner

CONCEPT MATCHING SYSTEM

CROSS REFERENCE TO RELATED PATENTS AND APPLICATIONS

Reference is made to copending application Ser. No 11/173,136, filed contemporaneously herewith Jul. 1, 2005, entitled CONCEPT MATCHING, by Agnes Sándor and Aaron Kaplan [hereinafter Sándor and Kaplan], the disclosure of which is totally incorporated herein by reference.

BACKGROUND

The present exemplary embodiment relates generally to document processing. It finds particular application in conjunction with a protocol for identifying text which relates to a concept, such as possible use of a new product advertised in a press release, and will be described with particular reference thereto. However, it is to be appreciated that the present exemplary embodiment is also amenable to other like applications.

Database and Internet searching are widely used for retrieving documents that are relevant to the information needs of a user. Many document processing problems involve finding text passages which express a given concept. Examples include information retrieval (IR), information extraction (IE), and question answering (QA) problems. Some concepts are generally expressed by a small set of fixed words or expressions and thus are readily easy to detect. For example, they may be detected automatically, using a simple keyword search or a set of regular expressions. Other concepts are more difficult to detect because their expressions are more varied. The problem stems from the fact that language is both productive and ambiguous: the same concept can be expressed by infinitely numerous expressions and, at the same time, the words making up the expressions can have different meanings in other contexts. Keyword searching is thus generally not applicable for concepts conveyed by a wide range of linguistic expressions.

Existing document processing systems typically deal with the productive nature of language by allowing substitution of similar expressions or expression schemata, where similarity is defined such that if one expression is relevant to a user's query, then similar ones can be assumed to be relevant as well. These similarities are usually defined using three levels of linguistic information: morphological equivalences, syntactic equivalences, and lexical semantic equivalences. For morphological equivalences, a morphological processing component can detect word forms that are inflected or derived from the same root, e.g.: X acquires Y; X acquired Y; and the acquisition of Y by X. For syntactic equivalences, a system can detect similarity between pairs of expressions such as: X acquired Y; and Y was acquired by X, by using specified syntactic rules. For lexical semantic equivalences, a system can be provided (by hand or using corpus statistics) with information about various semantic relationships, e.g. synonymy or hyponymy, among lexical units, and this information can be useful for detecting similarities such as: X acquired Y; and X bought Y.

By using generic linguistic resources of the above sorts, a system can allow users to specify a single search pattern that matches a range of different expressions. For example, using currently available linguistic resources, a user searching for descriptions of acquisitions could conceivably write a single pattern that matched all of the above descriptions of transactions. However, the range of expressions that convey a given concept may be even greater. For example, simple morphological, lexical, and syntactic substitutions would not be sufficient to match that same pattern with expressions such as:

Y will end up being owned by X

Y became the new owner of X

Some concepts tend to be expressed in relatively limited ways, and for such concepts, reasonable coverage and precision can be attained using the standard types of linguistic resources described above, if not with a single query pattern then with relatively few of them. The example of commercial transactions appears to be such a concept—in most corpora, the majority of commercial transactions can be matched with one of the patterns "X sell Y" or "Z buy Y" using the standard types of resources. For this reason, the problem of finding purchases of companies is often used as an example in the IE literature. But for other concepts, the number of patterns needed becomes unmanageable.

The challenge, then, is to provide a way of expressing patterns that generalize over the types of variation that cannot be accounted for using traditional morphological, syntactic, and lexical semantic resources. There has been a great deal of theoretical work on the sort of linguistic resources that would be necessary to do this in a general way—for example, the ideal semantic lexicon would contain, in a machine-processable form, the information that a purchase involves a change of ownership, and that an expression following "end up" is the resultant state of a change. A system endowed with such a lexicon could conceivably infer that "Y will end up being owned by X" is likely to indicate a purchase of X by Y. But in practice, the information that could be considered for inclusion in such a lexicon is boundless, and the process of encoding it is time-consuming and error-prone, so practical, general-purpose results do not appear to be forthcoming.

Text mining in scientific literature is currently an active area of research. The focus of such research is primarily on extracting domain information, e.g., protein function or chemical pathways. These methods produce (and some then synthesize) a large volume of information, with a small amount coming from each of many documents.

REFERENCES

Salton, G., "The SMART Information Retrieval System" (Prentice Hall, Englewood Cliffs, N.J. (1971)) discloses a searching system that uses vector-space representations.

U.S. Pat. No. 6,246,977 to Messerly, et al., discloses an information retrieval utilizing semantic representation of text and constrained expansion of query words.

U.S. Pat. No. 6,678,677 to Roux, et al., discloses a method for information retrieval using a semantic lattice.

Teufel, Simone, "Meta-discourse Markers and Problem-Structuring in Scientific Articles," in ACL Workshop on Discourse Structure and Discourse Markers pp. 43-49 (1998) discloses searching scientific literature for meta-discourse markers that indicate rhetorical structure, rather than for domain information. In Teufel's approach, the search patterns are simply word and punctuation strings (n-grams) of length two to six, and only n-grams that are frequent in the training corpus are considered.

Zhang, Y., et al., "Novelty and Redundancy Detection in Adaptive Filtering," Proc. ACM SIGIR, pp. 81-88 (2002) discusses the problem of "novelty detection," in which the goal is to decide whether or not a given sentence or document contains information that was not already expressed in previous documents.

Allan, J., et al., "First Story Detection in TDT is Hard," Conference on Information and Knowledge Management, Proceedings of the Ninth International Conference on Information and Knowledge Management, pp 374-381 (2000) discusses the problem of "first story detection," in which the object is to find sets of newspaper articles that describe the same event, in order to identify the earliest report of each event.

BRIEF DESCRIPTION

Aspects of the present disclosure in embodiments thereof include a system and a method for retrieving documents related to a concept from a text corpus. The system may include memory which stores a set of semantic classes which are combinable to express the concept and a set of keywords for each of the semantic classes to be used in searching documents in the text corpus, each set of keywords including at least one keyword, and a plurality of syntactic rules to be applied to identified text portions which include one or more of the keywords. Each of the syntactic rules identifies a first of the semantic classes and a second of the semantic classes. A rule is satisfied when a keyword from the first of the semantic classes and a keyword from the second of the semantic classes are in any one of a plurality of syntactic relationships. A concept matching module identifies text portions within the text corpus which include one or more of the keywords, applies the syntactic rules to the text portions, and identifies those text portions which satisfy at least one of the syntactic rules. Documents can thus be retrieved which include at least one of the identified text portions.

In another aspect, a computer implemented system for retrieving documents related to a concept from a text corpus includes a component for labeling selected keywords in the text corpus, a component which associates the labeled keywords with a semantic class, each of the semantic classes including a plurality of the keywords, a component which labels pairs of keywords of selected semantic classes which are in any one of a plurality of syntactic relationships, and a component which identifies documents which include a labeled pair of keywords.

The method for retrieving documents related to a concept from a text corpus includes labeling keywords in the text corpus which belong to at least one of a plurality of predefined semantic classes, labeling pairs of labeled keywords which are in any one of a plurality of syntactic relationships and which meet one of a plurality of predefined syntactic rules, and labeling documents which include at least one labeled pair. At least a portion of the documents which include at least one labeled pair are retrieved.

DETAILED DESCRIPTION

A system for concept matching in a text corpus, such as a collection of press releases about new products, is suited to identifying documents representing a concept, such as, for example, possible uses of the new product ("possible use"). The term "document" as used herein may comprise a portion of a document, such as an article abstract, or an entire document. Each document includes at least one text portion, and generally a plurality of text portions. Each text portion is typically a sentence, although it is contemplated that a text portion may be a portion of a sentence, such as a clause or portion in quotations. In the case of a press release, for example, there are typically on the order of five to ten sentences per document.

One exemplary concept matching system draws on the need of identifying portions of press releases that inform the readers about the possibilities of using the new product advertised in order that the user identifies those products relevant for the user's desired purposes. In aspects of the exemplary embodiment, the present system identifies possible uses by using lexico-syntactic pattern matching rules. The rules may be developed in the framework described in Sándor and Kaplan, the disclosure of which is totally incorporated herein by reference.

Figure 1:
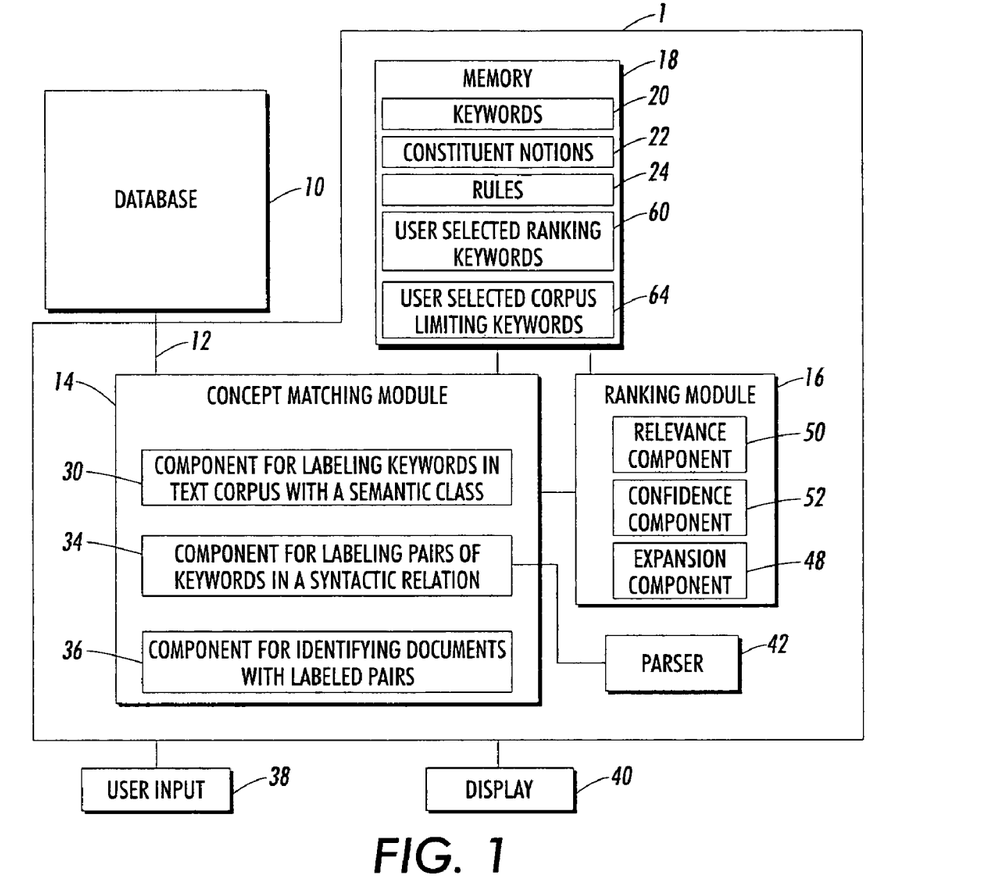
FIG. 1 is a schematic diagram of a concept matching system.

As illustrated in FIG. 1, an exemplary concept matching system 1 may consist of the following components:

1. A document database 10 that stores the documents to be searched, and facilitates their retrieval for further processing (or a suitable wired or wireless link 12 for accessing such a text corpus and retrieving documents therefrom).
2. A concept matching module 14 that identifies expressions that describe possible uses.
3. A ranking module 16 that ranks documents according to a scheme that takes into account both the results of the concept matching by the concept matching module 14, and (optionally) relevance to a user-specified topic.
4. A memory 18 which stores a set of preselected keywords 20 to be used in text searching.

The preselected keywords will be referred to herein as stored keywords or simply as keywords. The document database or other text corpus 10 to be searched is accessible to the concept matching module 14. The database may be provided on a hard disk of a computer system or on particular storage medium as CDs, DVDs, or other digital storage media. Alternatively, the database may be stored at a remote location connected to the computer system via a data transmission network. Any document storage system that allows keyword-based searches to be performed on a set of documents could alternatively be used. Alternatively or additionally, a system that allows indexing on syntactic information, such as that disclosed by U.S. Pat. No. 6,678,677 to Roux et al., may be employed. Such a system can reduce the number of documents that must be processed by the concept matching module, which tends to speed up query-time processing. The Roux patent is incorporated herein in its entirety by reference. It will be appreciated that the memory 18 may be incorporated into the concept matching module 14 rather than a separate component, as illustrated.

Figure 2:
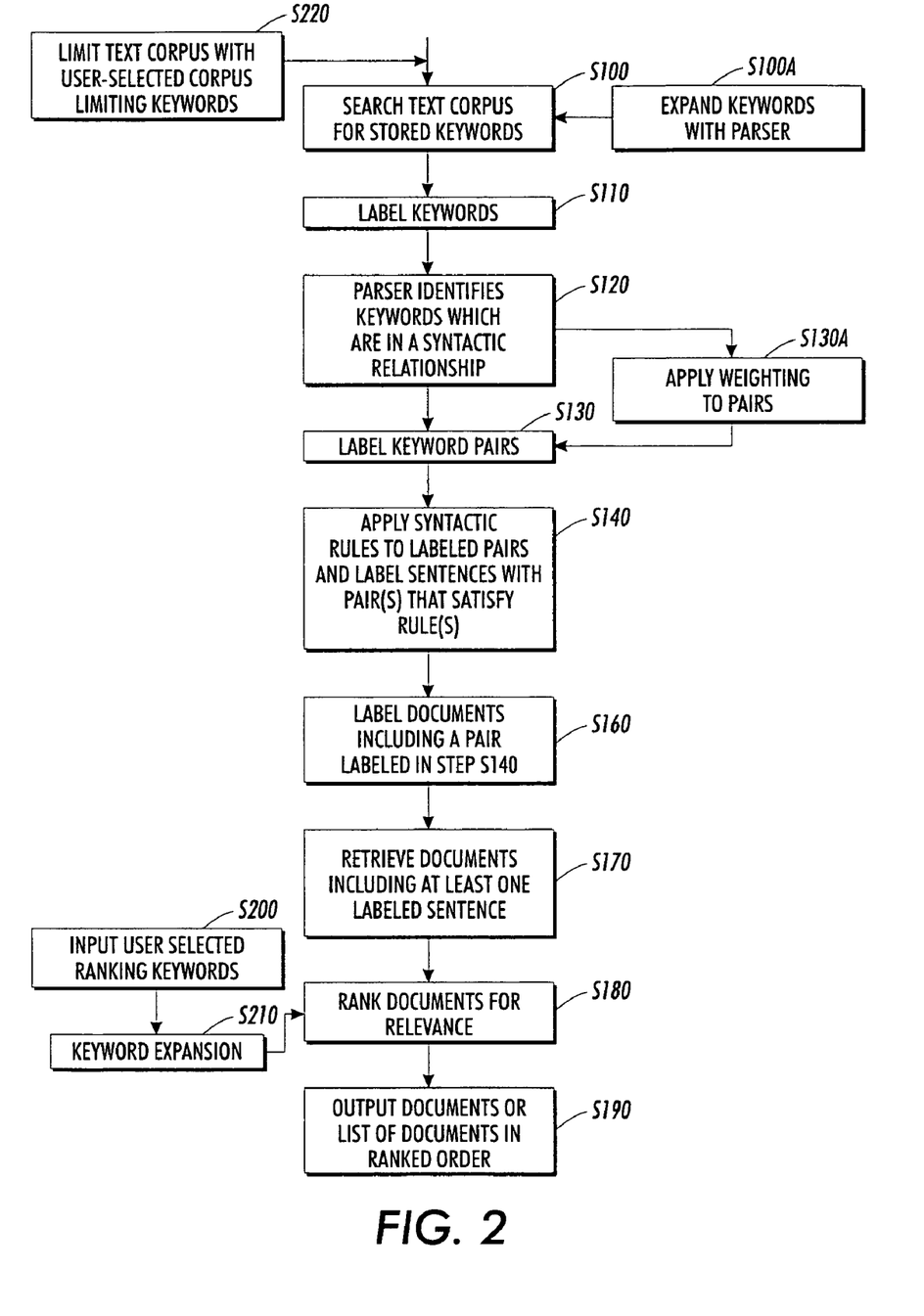
FIG. 2 is a flowchart for an exemplary process for concept matching in a text database using developed keywords, constituent notions, and co-occurrence syntax rules.

As illustrated in FIG. 2, an exemplary process for identifying documents includes identifying preselected stored keywords 20 in the text corpus which belong to at least one of a plurality of predefined semantic classes 22 (Step S100) and labeling them (Step S110), identifying pairs of labeled keywords which are in any one of a plurality of syntactic relationships (Step S120), and labeling them (Step S130), identifying labeled pairs which meet one of a plurality of predefined syntactic rules 24 and labeling sentences containing them (Step S140), labeling documents which include at least one sentence containing a labeled pair (Step S160) and retrieving at least a portion of the documents which include at least one sentence containing a labeled pair (Step S170). Further steps may include ranking the documents according to relevance (Step S180) and outputting a list of documents ordered by rank (Step S190).

Development of a Concept Matching System

Sándor and Kaplan discloses a methodology for developing systems that find concepts in natural language text. The method uses syntactic dependencies and task-specific semantic classes. The method is particularly suited to developing a system which, with a reasonable assurance of accuracy, uncovers all or at least a preponderance of text/documents considered relevant to the particular search undertaken. In particular, the methodology develops a concept matching system which evaluates a set of documents which form all or a selected portion of a database. The methodology for developing a system for finding a selected target concept in a text corpus can be generally described as including the following operations:

1. Identifying a set of task specific semantic classes ("constituent notions") which can be combined to express the target concept.
2. Identifying a list of keywords for each of the constituent notions to be used in text searching in a text corpus, such as a document database.
3. Establishing a set of patterns ("syntactic rules"), involving syntactically related keywords of the constituent notions identified in step 1, which are applied to text uncovered in the text searching.

Further operating steps may include:

4. Evaluating the methodology on a test text corpus, such as a subset of the documents in the database.
5. Repeating steps 1-4, as appropriate, to refine the constituent notions, keyword lists, and set of syntactic rules in order to improve the retrieval performance of the system.

Retrieval performance of the concept matching system can be defined in terms of recall and/or precision. Recall is the fraction of all relevant documents that are retrieved. Precision is the fraction of all retrieved documents that are relevant.

The words that instantiate a given constituent notion form a sort of semantic class. However, the present semantic classes differ from traditional ones in that their members need not share any of the usual morphological, syntactic or semantic properties. The methodology of Sándor and Kaplan includes developing a set of task-specific semantic classes which can be combined to express a target concept in a search to be performed. These classes will be referred to herein as constituent notions and may be identified by a notion identifier, such as a word or phrase, alphanumeric characters or the like. For each constituent notion within the set of constituent notions that have been identified, a set of keywords which relate to the constituent notion is identified. While particular reference is made to keywords as being single words, the set of keywords may also include hyphenated words, compound words, roots of words (such as acquire or acquir* in place of acquiring, acquired, etc.), and the like. Although the set of keywords may include the notion identifier, as well as synonyms and homonyms of the notion identifier, it need not do. The set of keywords generally includes words which are related to the constituent notion and, in particular, words which may be used in relevant expressions when the constituent notion is being conveyed. The words selected for a particular constituent notion are thus related to each other primarily in that they relate to the same constituent notion, not in that they have the same meaning, although some words may have the same or similar meanings as other words in the set. It is contemplated that a keyword associated with one constituent notion may also be associated with one or more, but generally fewer than all, of the other constituent notions in the set of constituent notions.

While the set of keywords for a given constituent notion may include as few as one keyword, it is contemplated that several of the constituent notions in the fully developed concept matching system (e.g., at least three, and in one embodiment, at least four constituent notions) will each be associated with at least five or at least ten keywords. Typically, most or all of the constituent notions will be associated with a greater number of keywords, e.g., five, ten or more. The number of keywords in a set is not limited. However, keywords which are found not to improve information retrieval are generally dropped from the set of keywords during development of the concept matching system. During the development of the concept matching system, keywords can be added to or removed from the sets of keywords. Similarly, the number of semantic classes is not limited, but will be generally be at least three and may be less than ten.

Various ways for developing the set of keywords are contemplated. These include, for example, analysis of a set of documents which have already been determined to satisfy the search criteria, keywords proposed by an interactive computer program, user evaluation of sentences proposed by a computer processing system in response to input keywords, and the like. The words selected for the constituent notions can be later verified by testing the methodology on a test set of documents and refined, as appropriate. For example, the set of keywords is refined by removing keywords which prove to be overly general and/or adding additional keywords which retrieve additional relevant documents, to increase the overall retrieval performance.

An exemplary methodology involves the development of a set of syntactic rules by which text uncovered by searching for the selected keywords is to be further evaluated for relevance. The rules identify pairs of constituent notions which when present in text in syntactic relationship to one another, are found to improve or anticipated to improve retrieval performance. Once again, this may be an iterative process. For example, a rule is added to or deleted from the set of rules or an existing rule modified and the new set of rules tested on a test corpus, such as a subset of the documents in the database, to assess the retrieval performance of the modified rule set.

Syntactic relationships between words in a punctuated natural language text portion can include, for example, the following relationships:

S1 between verb and its subject
S2 between verb and its object
S3 between adjective or adverb and the noun, verb or adjective it modifies
S4 between a noun and another noun that it premodifies
S5 between a noun and a noun or verb that it modifies by prepositional attachment For computer implementation of the system, an automated parser can be used to identify syntactic relationships in the documents which are selected by means of the search for keywords. The parser examines the text for syntactic relationships and labels the pairs of words involved in the syntactic relationships. The output of the parser is a set of pairs of linked words and, optionally, the syntactic relationship between the linked words in each pair. The number of syntactic relationships which may exist is virtually unlimited and in general, the parser searches for only a limited subset of the possible syntactic relationships. An exemplary parser of this type is described, for example in U.S. Patent Application No. 2003/0074187, published Apr. 17, 2003, to Ait-Mokhtar, et al., which is incorporated herein in its entirety by reference. For any sentence there may be zero, one or more syntactic relationships identified. Additionally, some keywords may appear in more than one syntactically related pair.

The set of rules developed identifies pairs of semantic classes which are in any one of a plurality of syntactic relationships. In any rule, each of the two related words (such as a verb and its subject) represents one of the constituent notions. For example for a set of constituent notions N1, N2, N3, ... Nx and a set of selected syntactic relationships to be detected S1, S2, S3, S4, S5, ... Sy, where x is the number of constituent notions in the set of constituent notions, and y is the number of syntactical relations which are accepted, some or all of the constituent notions are incorporated into at least one of the rules developed. For example, Rule R1={S1, S2, S3, S4, S5, ... Sy} [N1+N2], i.e., words form semantic classes N1 and N2 are in any syntactic relationship S selected from S1, S2, S3, ... Sy.

Rule R1 is satisfied for a given text portion when any keyword belonging to constituent notion N1 and any keyword belonging to N2 are in syntactic relationship, for example S may be S2, an object/verb syntactic relationship. In this example, a keyword from N1 may be the verb and the keyword from N2, the object, or vice versa. In its broadest application, the syntactic relationship S between the two constituent notions can be any or all of the syntactic relationships to be detected by the parser. Generally, an automated parser is capable of identifying a fixed set of syntactic relationships at a sentence level. In accordance with aspects of the exemplary embodiment, the syntactic relationships which satisfy a given rule are all of those which the parser to be used by the concept matching system is capable of identifying. In an alternative embodiment, a rule may define a specific subset of the syntactic relationships to be applied by the parser, such as one, two, three, four, six, or eight of the syntactic relationships identified by the parser. In one embodiment, all of the rules apply the same set of syntactic relationships, which, as noted above, may be all of the syntactic relationships which can be identified by the parser.

The rules can be written in the same grammar formalism as used by the parser so that the rules are readily applied to the output of the parser. Alternatively, a different formalism is used for the rules.

The developed syntax rule may be associated with a weighting. The weighting roughly reflects the anticipated or observed relative importance of the rule in the overall retrieval performance. In its simplest form, all rules may be given the same weighting of 1. In more complex weighting schemes, the rules may each be assigned a weighting W of $0 < W \leq 1$. For example, some rules which are considered to strongly improve retrieval performance are assigned a weighting of 1 while others, considered to weakly affect retrieval performance, are assigned a weighting of 0.5. A weighted sum over all the rules of the product of number of occurrences that a rule is satisfied within a sentence or other text portion being evaluated (the occurrence rate T) and its weighting W can then be made.

In one embodiment, the concept matching system only retrieves documents with a weighted sum of at least 1. For the example above, this is satisfied by one rule with a weighting of 1 or two rules with a weighting of 0.5 in the same sentence. In another embodiment, a more relaxed system retrieves documents having a weighted sum of at least 1 (which could be satisfied by two rules with a weighting of 0.5 in different sentence.

A ranking of the documents can be made. This may be based on their scores, for example, by taking into account the weighted sum or other ranking schemes, such as those based on the occurrence of specific keywords. The ranking of documents may be performed by a ranking module of the system.

As an alternative to ranking, the system may list all documents which are considered to be relevant. The minimum relevance criteria may be for example, one pair of constituent notions in syntactic relationship or, where a weighting is applied, a minimum value of the sum of (occurrences x weighting) e.g., a minimum of 1. A minimum of 1 can be obtained, for example, where a "strong" pair of constituent notions (with a weighting of 1) is present or where two "weak" pairs of constituent notions (each with a weighting of 0.5) are present.

An exemplary methodology is outlined below. At each step, it is indicated what kind of automatic support the development environment (e.g., a computer system used for developing the concept matching system) may offer.

1. Find sample expressions that express the desired concept, and extract from them a first set of keywords. This could be supported by a simple keyword query interface—given a keyword or combination of keywords that the user thinks might be useful, the system could provide sample sentences in which that word occurs. The user could label retrieved examples as relevant or not relevant, for use as training data for step 2b below. In one embodiment, a computer processing unit is connected to a user input, such as a keyboard or touch screen. The user inputs a selected keyword and the processing unit proposes sample sentences. The processing unit may alternatively or additionally propose words, for example on a display, such as a screen. The user may select, from the proposed words, those which are considered by the user to be most appropriate for the search. These words are then added to the set of keywords.

2. Iteratively,
  a. By examining the keywords collected so far, manually identify a number of constituent notions that can be combined to express the target concept, and form classes of keywords such that all of the words in a class express the same constituent notion. Each keyword may express one or more constituent notions. This step depends on human intuition and is not readily automated; automatic support may be limited to an interface that facilitates the manual classification.
  b. Write rules indicating which combinations of constituent notions can be combined to express the desired concept, and how these combinations can be realized syntactically. Examples labeled in step 1 can be parsed automatically to give suggestions for such rules that the user can validate or reject. For combinations of keywords that do not occur in the sample expressions, the system could automatically find examples in a corpus and present them to the user for annotation.
  c. Apply the rules to a test text corpus and evaluate the results. The application of the rules to a corpus can be automated entirely. An efficient way to implement this involves searching the text for sentences that contain the necessary keywords, parsing these sentences, and then filtering the parsed sentences according to the co-occurrences rules. The evaluation of the results is generally performed manually.
  d. Refine:
    i. If coverage is not yet sufficient, identify additional keywords (and/or remove keywords) and repeat from step b). This may be done by hand by examining sentences retrieved in step c); the system may also make suggestions automatically by identifying words that frequently occur in syntactic relations with known keywords.
    ii. If precision is not sufficient, refine co-occurrence rules and repeat from step c). The system may prompt the user to mark sentences that were retrieved but should not be, indicating which rule was responsible for the selection of each such sentence, and allowing the user to edit that rule.

The exemplary system disclosed herein may be developed with a small, manually-collected set of documents, such as press releases, in which the expressions that convey the target concept are identified. The concept of possible use is used here as an example. It will be appreciated that similar systems may be developed to search for text relating to other complex concepts.

The following are examples of sentences that the system may be adapted to detect:

1. Applications of AlInGaP LEDs, now centering on outdoor displays and car interior trim, are expected to broaden to include illumination, traffic light, and car exterior trim.
2. Designed for the retail, hospitality and architectural industries, the package consolidates and delivers multiple lighting processes in one system.
3. Developers immediately benefit from features such as viewing structural elements without constantly reverting to its source code.

The Concept Matching Module

The concept matching module 14 can be built on the conceptual framework described in Sándor and Kaplan, the disclosure of which is totally incorporated herein by reference. The framework allows a complex concept, in the exemplary embodiment, the concept of a change in the direction of scientific research, to be described using a set of syntactically heterogeneous keyword classes, and co-occurrence rules that use syntax.

With reference once more to FIG. 1, the concept matching module 14 can access or include the memory 18 which stores the preselected keywords 20, the constituent notion(s) 22 with which each keyword is associated, and the set of rules 24, in computer readable form. The illustrated concept matching module 14 includes processing software, including: a component 30 which, using the keywords stored in the memory, labels keywords in the text corpus with the names of the semantic classes to which they belong; a component 34 which labels pairs of keywords of selected semantic classes which are in any one of a plurality of syntactic relationships; and a component 36 which identifies documents which include a labeled pair of keywords 20. A user input 38, such as a keyboard or touch screen, and an associated display 40, such as a screen, allow a user to interact with the concept matching module. The concept matching module 14 accesses a parser 42 which identifies the syntactic relationships in text retrieved form the text corpus which includes keywords.

For each document, rules can be applied at four levels:

1. word level: keywords belonging to certain semantic classes are labeled;

2. word pair level: pairs of syntactically linked keywords are labeled, based on the labels of the individual words;

3. sentence level: sentences are labeled, based on the labels of the keywords and word pairs they contain; and 4. document level: a label is assigned to the document based on the set of sentence labels it contains.

Following the methodology described in Sándor and Kaplan discussed above, the concept of possible use can be broken down into constituent notions, and lists of words that express those constituent notions compiled. On the basis of a manually collected set of example sentences, the following seven constituent notions can be identified (TABLE 1). Each constituent notion is presented with a few examples of words that express it.

TABLE 1

| CONSTITUENT NOTION | BRIEF DESCRIPTION | EXEMPLARY KEYWORDS |
|---|---|---|
| Future | reference to future when the product will be used | introduce, available, future, promising |
| Use | reference to uses of devices | employ, fulfill, feature |
| User | reference to the user of the new product | customer, demand, industry |
| Produce | reference to the production of the new product | create, release, design |
| Producer | reference to the producer of the new product | company, deliver, manufacturer, offer |
| Product | reference to the new product | achievement, application, device |
| Possibility | express possibility | can, expect, ideally |

Generally depending on the concept, different constituent notions are used to describe different concepts. Once a paraphrase (or definition) of the concept is developed using a set of example documents, a constituent notion may be defined for each word in the paraphrase. In the example of possible use, a simple paraphrase sheds light on the motivation of the choice of its constituent notions: the concept of possible use involves a user that in the future will have the possibility to use a product produced by a producer. It will be appreciated that possible use expression need not contain all seven constituent notions. The rules presented below describe which combinations of constituent notions may be considered sufficient to indicate a possible use.

With reference once more to FIG. 2, the first level of processing (Step S100) is thus to find occurrences in the text of words from the above seven classes, in order to assign the appropriate class labels to those occurrences (Step S120). The keywords associated with the constituent notions can be automatically expanded by the parser or other keyword search program to include words with the same root as those specifically enumerated (Substep S100A). The linguistic tool used for finding the roots of words may be a component of the parser 42 used for development of the concept matching system.

For example, in the following sentence drawn from the sample set of relevant documents, the constituent notions of PRODUCE, PRODUCT, PRODUCER, USER, USE are identified:

Designed for [PRODUCE] the retail, hospitality and architectural industries [USER], the package consolidates and delivers [PRODUCER] multiple lighting processes [USE] in one system [PRODUCT].

In a second level of processing (Step S120), each sentence is parsed, using a dependency parser 42 that outputs pairs of words that are syntactically related. An automated parser capable of this type of processing is described for example in U.S. Patent Application No. 2003/0074187, the disclosure of which is incorporated herein in its entirety by reference. For the example sentence given above, the parser yields (among other dependencies):

(retail, the)
(consolidates, package)
(system [PRODUCT], delivers [PRODUCER])
(designed [PRODUCE], industries [USER])

indicating that "The" is syntactically related to "retail" (in this case "the" is the determiner of the noun phrase whose head is "retail"), "package" is related to "consolidate" (it is the verb's subject), and so forth.

A weighting may be applied to each syntactically related pair of words which each also express one of the constituent notions (Substep S130A). For example, the pair-level label strong or weak is assigned to each pair in which both words received constituent notion labels. Within each weighting type (weak and strong in the present embodiment), further refinements or subtypes may be defined. For example, the weak label may be further refined into a number of subtypes that correspond to different aspects of the complex concept of possible use. These subtypes may be used as input to more sophisticated rules in subsequent levels. Additionally, one or more rules may require the presence of two or more pairs from specified constituent notions.

In one embodiment, word label pairs that receive the label weak are specifically identified; other pairs receive the label strong by default. Exemplary pair-level rules, which list explicitly the word label pairs that receive the label weak may be as shown in Table 2. In this specific example, pairs that match the patterns in Table 2 are assigned the pair-level label weak. The variable x can be instantiated by any label. A pair of words which both received word-level labels, and where the pair does not match any of these patterns receives the label strong.

TABLE 2

| PAIR |
| --- |
| (product, product) |
| (product, producer) |
| (product, produce) |
| (keywords labeled weak, x) |
| (possibility, x) |

For example, given the sentence:

AMD is leading the way to pervasive 64-bit computing and NVIDIA is helping make it possible [POSSIBILITY] for developers [USER] to take advantage of this technology . . . .

the parser yields the pair (developers_USER, possible_POSSIBILITY)

which matches the pattern (possibility, x) and is thus assigned the label weak.

The third level of rules assigns each sentence a label, based on the keyword pair(s) it contains (Step S160). The label can be based on whether the sentence satisfies a minimum relevance criterion. If no weightings are applied, the minimum relevance criterion can be an integer representing a number of rules to be satisfied by the sentence in order for the sentence to be considered relevant. In one embodiment, the minimum number is one. Where weighting is applied to the rules, a more complex ranking scheme may be developed. For example, a sum of the products of number of times a rule is satisfied and its weighting can be obtained and a minimum acceptable value of this sum established. Optionally, a document is selected as relevant if it contains at least one possible use sentence (Step S170).

In one specific embodiment, only one label is relevant for the identification of possible uses: the label possible_use. This label is assigned to any sentence that contains at least one strong pair or at least two weak pairs.

Certain of the keywords may be considered to be of special importance. In one embodiment, a sentence in which an important keyword appears is immediately selected as a potential use sentence, irrespective of any further rules.

While the above scheme works primarily at the sentence level, it is also contemplated that rules may be developed that allow the detection of constituent notions defining a concept that span multiple sentences. This may involve propagating the subtypes of the weak label at the word pair level up to the document level, and writing document-level rules that indicate which combinations of these subtypes indicate a concept. The exemplary rules described herein may be best suited to short documents, such as press releases. More sophisticated document-level processing may be appropriate for longer documents.

The Ranking Module

The documents to be presented to the user can optionally be ordered by a ranking function (Step S180) intended to concentrate the most interesting articles near the top of the list. This ranking function may include one of two different sorts of information or a combination thereof:

1. Degree of confidence that the document describes a possible use of a new product
2. Relevance of the document to the user's topic The degree of confidence that the document describes a possible use is estimated from information returned by the concept-matching module. This can include one or more of: the identifier of the detection rule that was triggered (some rules may be more reliable than others), the number of different rules that were triggered by that document, and the total number of rules triggered (optionally modified by applying a weighting for some or all the rules).

Estimating the relevance of a document to a topic is a classical problem with well-understood solutions. Some document retrieval systems include relevance ranking functionality. If such a system is used as the document base component, then its built-in relevance score can be factored into the final ranking. If the interface to the document base does not perform relevance ranking, a separate relevance ranking module can be implemented. In one embodiment, the user provides this module with a list of user-selected keywords, and weightings for these keywords. The ranking module 16 assigns a relevance score that is the weighted sum of the number of occurrences of those keywords. The user-selected keywords 60 may be the same user-selected keywords initially used to narrow the search.

In one embodiment, the ranking module 16 includes a component 48 for expanding the user selected keywords 60 through access to a thesaurus or other lexical resource. The thesaurus may be integral with the ranking module or accessed thereby. The component 48 may interact with the user via the user input 38 to select or deselect appropriate ones of the additional words proposed by the expansion component 48. The ranking module 16 may also include a component 50 for determining confidence and a component 52 for determining relevance then combines these two scores (relevance and degree of confidence) to produce a single ranking. Given a sufficient number of annotated examples, parameters for combining the scores can be estimated statistically, using a linear model for example. Other ranking systems are also contemplated.

The concept matching system can be viewed as a special-purpose information retrieval (1R) system. It is particularly suited to applications where mere keyword-based retrieval would not be effective, for example, because the expressions to be looked for tend to involve high-frequency, non-technical words that cause many false hits. By employing patterns of syntactically-linked keyword pairs rather than simply individual keywords a higher recall is achieved without an unacceptable decline in precision.

To use the concept matching system on a database of documents, a user optionally inputs a set of one or more user selected ranking keywords 60 to the ranking module 16 which are applicable to the area of research in which the documents are sought (step S200). These user-selected keywords are generally very broad terms intended to be inclusive, rather than selective. For example, the user selected keywords may include the name of a particular product class as well as various words known to be used in discussions of that product, class even if such words are not highly discriminative for documents about the product class. The operator of the system may be prompted to provide the set of user-selected keywords. The system may expand on the user selected keywords, using a parser, thesaurus or based on cooccurrence statistics, and optionally provide the operator/end user with the expanded set of keywords and prompt the operator to select appropriate ones to be used (STEP 210). Relevant documents are identified automatically using the system keywords and rules, and optionally ranked as described above, for example, using the same or a different set of user-selected keywords by the relevance module. The retrieved documents can be composed into a listing, summary or other format desired by an end user. The system may be used periodically to update the search results.

Alternatively or additionally, a user inputs user-selected corpus limiting keywords 64, which may be the same or different from the user-selected keywords 60 (Step S220). Applying these user selected keywords 64 to the text corpus at an initial stage, rather than in a later, document ranking process, can thus reduce the search time for the identification of relevant documents. The user-selected keywords help to reduce the text corpus to be examined. The concept matching system then operates on a modified text corpus, as limited by the user-selected keywords.

Present text mining systems are insufficient for identifying possible use as the variety of expressions used to convey the possible use concept is so great that using only frequent n-grams would result in extremely low coverage. The more flexible pattern formalism provided by the present system can detect expressions that were unseen in the development corpus.

The concept matching system has application for a variety of domains. Although the exemplary system was developed using a test set of documents from press releases, the same system, including keywords, constituent notions and rules can be used to find documents from another database related to the same complex concept.

The following non-limiting example demonstrates the effectiveness of the concept matching system.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for retrieving documents related to a concept from a text corpus comprising:
   a computer comprising non-transitory storage media which stores:
   a set of at least four semantic classes, each including at least five keywords, which classes are combinable in different combinations thereof according to predefined syntactic rules to express the concept,
   a set of user-selected keywords for each of the semantic classes to be used in searching documents in the text corpus, each of a plurality of the sets of user-selected keywords including a plurality of user-selected keywords, at least some of the semantic classes including keywords which are used in relevant expressions in retrieved text when the constituent notion is being conveyed and including keywords having different meanings from other keywords of the same semantic class and which are not synonymous with the other keywords of the same semantic class, and
   a plurality of the syntactic rules to be applied to identified text portions which include one or more of the user-selected keywords, each of the syntactic rules identifying a pair of semantic classes comprising a respective first of the semantic classes and a respective second of the semantic classes, whereby different rules identify different pairs of semantic classes, the rule being satisfied when any first keyword from the first of the pair of semantic classes and any second keyword from the second of the pair of semantic classes are in any one of a plurality of syntactic relationships; and
   a concept matching module, which accesses the memory, and which identifies text portions within the text corpus which include one or more of the keywords and which applies each of the syntactic rules to the text portions and identifies those text portions which each satisfy at least one of the syntactic rules, and retrieves documents which include at least one of the identified text portions.

2. The system of claim 1, wherein the syntactic relationships include at least two of the following pairs, where the first of the semantic classes includes a keyword in one of the pair and the second of the semantic classes includes a keyword in the other of the pair:
   a verb and its subject;
   a verb and its object;
   one of an adjective and an adverb and one of a noun, verb and adjective that the adjective or adverb modifies;
   a noun and another noun that the noun premodifies; and
   a noun and one of a noun and verb that the noun modifies by prepositional attachment.

3. The system of claim 1, wherein the plurality of syntactic relationships comprises at least four syntactic relationships.

4. The system of claim 1, wherein each of the plurality of syntactic rules applies the same set of syntactic relationships.

5. The system of claim 1, wherein a plurality of the semantic classes correspond to constituent notions selected from the group consisting of: use, user, produce, producer, product, future, possibility.

6. The system of claim 1, wherein at least one of the semantic classes includes a keyword of another of the semantic classes.

7. The system of claim 1, wherein at least one of the syntactic rules identifies a third of the semantic classes and a fourth of the semantic classes, the rule being satisfied when a keyword from the first of the semantic classes and a keyword from the second of the semantic classes are in any one of the plurality of syntactic relationships and a keyword from the third of the semantic classes and a keyword from the fourth of the semantic classes are in any one of the plurality of syntactic relationships.

8. The system of claim 1, further comprising:
   a ranking module which ranks retrieved text according to one or more ranking rules.

9. The system of claim 8, wherein the ranking rules account for a weighting of a syntactic rule.

10. The system of claim 8, wherein the ranking rules account for at least one of:
a number of times a syntactic rule is satisfied in a text passage; and
a number of occurrences of keywords from a set of keywords which are considered to express the concept irrespective of the existence a syntactic relationship.

11. The system of claim 1, further comprising a parser, accessed by the concept matching module, which identifies the plurality of syntactic relationships in text and the syntactic relationships optionally comprise all the syntactic relationships that the parser identifies.

12. The system of claim 1, wherein the computer implemented means applies a weighting to one or more of the syntactic rules and identifies text portions within the text corpus which satisfy a minimum weighted sum of the syntactic rules occurring in the text portion.

13. The system of claim 1, wherein the concept matching module includes:
a component which labels selected keywords in the text corpus;
a component which associates the labeled keywords with a semantic class, each of the semantic classes including a plurality of the keywords;
a component which labels pairs of keywords of selected semantic classes which are in any one of a plurality of syntactic relationships; and
a component which identifies documents which include a labeled pair of keywords.

14. A system for retrieving documents related to a concept from a text corpus comprising:
a computer comprising non-transitory storage media which stores:
a set of semantic classes which are combinable to express the concept and wherein there are from three to ten semantic classes which are combinable according to syntactic rules in different combinations thereof,
a set of user-selected keywords for each of the semantic classes to be used in searching documents in the text corpus, each of a plurality of the sets of user-selected keywords including a plurality of user-selected keywords, at least some of the semantic classes including keywords which are used in relevant expressions in retrieved text when the constituent notion is being conveyed and including keywords having different meanings from other keywords of the same semantic class and which are not synonymous with the other keywords of the semantic class, and
the syntactic rules to be applied to identified text portions which include one or more of the user-selected keywords, each of the syntactic rules identifying a pair of semantic classes including a respective first of the semantic classes and a respective second of the semantic classes, the rule being satisfied when any first keyword from the first of the semantic classes and any second keyword from the second of the semantic classes are in any one of a plurality of syntactic relationships; and
a concept matching module, which accesses memory, and which identifies text portions within the text corpus which include one or more of the keywords and which applies each of the syntactic rules to the text portions and identifies those text portions which each satisfy at least one of the syntactic rules, and retrieves documents which include at least one of the identified text portions.

15. A computer system for retrieving documents related to a concept from a text corpus comprising:
a computer comprising non-transitory storage media which stores:
a set of semantic classes which are combinable in different pairs thereof according to predefined syntactic rules to express the concept, and, for each of the semantic classes, a set of predefined user-selected keywords to be used in searching documents in the text corpus, each keyword expressing a constituent notion represented by the semantic class and which has been identified as being used in relevant expressions where the constituent notion is being conveyed, at least some of the keywords having different meanings from other keywords of the same semantic class and which are not synonymous with the other keywords in the semantic class, and
a plurality of the syntactic rules to be applied to identified text portions which include one or more of the predefined keywords, each of the syntactic rules identifying a respective first of the semantic classes and a respective second of the semantic classes, the rule being satisfied when any keyword from the first of the semantic classes and any keyword from the second of the semantic classes are in any one of a plurality of syntactic relationships, whereby different rules identify different combinations of semantic classes; and
a concept matching module, which accesses the memory comprising:
a software component which labels selected keywords in the text corpus;
a software component which associates the labeled keywords with a semantic class, each of the semantic classes including a plurality of the keywords;
a software component which labels pairs of keywords of selected semantic classes which are in any one of a plurality of syntactic relationships; and
a software component which identifies documents which include a labeled pair of keywords; and
a display which allows a user to interact with the concept matching module and input the keywords.

16. The system of claim 15, wherein the plurality of semantic classes comprises at least three semantic classes.

17. A method for retrieving documents related to a concept from a text corpus of stored documents comprising:
for each of a set of at least four predefined semantic classes, which classes are combinable according to predefined syntactic rules in different combinations thereof to express the concept, storing a set of user-selected keywords in computer readable form on computer storage media as being associated with that class, each of at least four of the predefined semantic classes including at least five keywords, at least some of the semantic classes including keywords which are used in relevant expressions in retrieved text when the constituent notion is being conveyed and including keywords having different meanings from other keywords of the same semantic class and which are not synonymous with the other keywords of the semantic class;
labeling keywords in the text corpus which belong to at least one of the predefined semantic classes;
labeling pairs of labeled keywords, using a computer, which are in any one of a plurality of syntactic relationships and which meet one of the predefined syntactic rules, each of the syntactic rules identifying a pair of semantic classes comprising a respective first of the semantic classes and a respective second of the semantic classes, whereby different rules identify different pairs of semantic classes, the rule being satisfied when any first keyword from the first of the pair of semantic classes and any second keyword from the second of the pair of semantic classes are in any one of a plurality of syntactic relationships, wherein at least some of the keyword pairs are assigned a weight indicative of retrieval performance; and labeling documents in the corpus which include at least one labeled pair; and retrieving at least a portion of the documents from the corpus which include at least one labeled pair based on a ranking which takes into account the weight accorded to the keyword pairs.

18. The method of claim 17, further comprising:
labeling sentences in the text corpus which include at least one labeled pair of labeled keywords.

19. The method of claim 17, further comprising:
using user-selected keywords to identify the text corpus within a larger text Corpus.

20. The method of claim 17, further comprising:
the labeling pairs of labeled keywords which are in any one of the plurality of syntactic relationships including employing a parser which identifies pairs of words which are in any one of a plurality of predefined syntactic relationships.

* * * * *